US012387222B2

(12) United States Patent
Lundell et al.

(10) Patent No.: US 12,387,222 B2
(45) Date of Patent: Aug. 12, 2025

(54) APPLYING A MACHINE LEARNING MODEL TO GENERATE A RANKED LIST OF CANDIDATE ACTIONS FOR ADDRESSING AN INCIDENT

(71) Applicant: Oracle International Corporation, Redwood Shores, CA (US)

(72) Inventors: Jens Olof Lundell, Santa Cruz, CA (US); Terrence Alan Moltzan, Bozeman, MT (US); Lucas G. Cusimano, Holmes Beach, FL (US)

(73) Assignee: Oracle International Corporation, Redwood Shores, CA (US)

( * ) Notice: Subject to any disclaimer, the term of this patent is extended or adjusted under 35 U.S.C. 154(b) by 159 days.

(21) Appl. No.: 17/736,863

(22) Filed: May 4, 2022

(65) Prior Publication Data

US 2023/0360058 A1 Nov. 9, 2023

(51) Int. Cl.
*G06Q 30/016* (2023.01)
*G06Q 10/0631* (2023.01)
*G06Q 10/0633* (2023.01)
*H04L 41/5074* (2022.01)

(52) U.S. Cl.
CPC ..... *G06Q 30/016* (2013.01); *G06Q 10/06316* (2013.01); *G06Q 10/0633* (2013.01); *H04L 41/5074* (2013.01)

(58) Field of Classification Search
CPC ............ G06Q 10/0633; G06Q 30/016; G06Q 10/06316; G06Q 30/015; H04L 41/5074; G06N 5/04
See application file for complete search history.

(56) References Cited

U.S. PATENT DOCUMENTS 10,410,219 B1 * 9/2019 El-Nakib ............. G06Q 30/016
10,785,373 B1 * 9/2020 Padalkar ............. G06Q 30/016
(Continued)

OTHER PUBLICATIONS

Agarwal, "Automated Assignment of Helpdesk Email Tickets: An artificial Intelligence Life-Cycle Case Study," 2020, Innovative AI Applications, pp. 45-62 (Year: 2020).*
(Continued)

*Primary Examiner* — Ivan R Goldberg
(74) *Attorney, Agent, or Firm* — Invoke

(57) ABSTRACT

Techniques for providing candidate actions to a service agent based on a customer incident and associated attributes are disclosed. In one or more embodiments, a customer incident response system allows a customer support team to leverage a data ecosystem available to provide service agents with contextually relevant insights into a current data context that describes the customer incident. The system allows an administrator to configure connections to endpoints for external and/or third-party services, including artificial intelligence (AI), machine learning, static content, temporally based content, and rules-based content. Once configured, the system displays a series of insight cards near an incident workspace, where each insight card includes an action that the service agent may execute to attempt to resolve the customer incident. The system allows for external AI engines to generate insights and potential next actions to address the customer incident while enjoying a simplified setup.

20 Claims, 7 Drawing Sheets

(56) References Cited

U.S. PATENT DOCUMENTS

| | | | |
|---|---|---|---|
| 2015/0285398 A1* | 10/2015 | Govindan | G06Q 10/06 |
| | | | 702/183 |
| 2016/0189164 A1* | 6/2016 | Tolksdorf | G06Q 30/016 |
| | | | 705/304 |
| 2019/0108470 A1* | 4/2019 | Jain | G06Q 10/063118 |
| 2021/0200523 A1* | 7/2021 | Singh | G06Q 10/063 |
| 2021/0398001 A1* | 12/2021 | Forte | G06N 5/047 |

OTHER PUBLICATIONS

"Knowledge Base (3228)", Retrieved at https://cx.rightnow.com/app/answers/list/product_line/~, Retrieved on May 2022, 2 Pages.

* cited by examiner

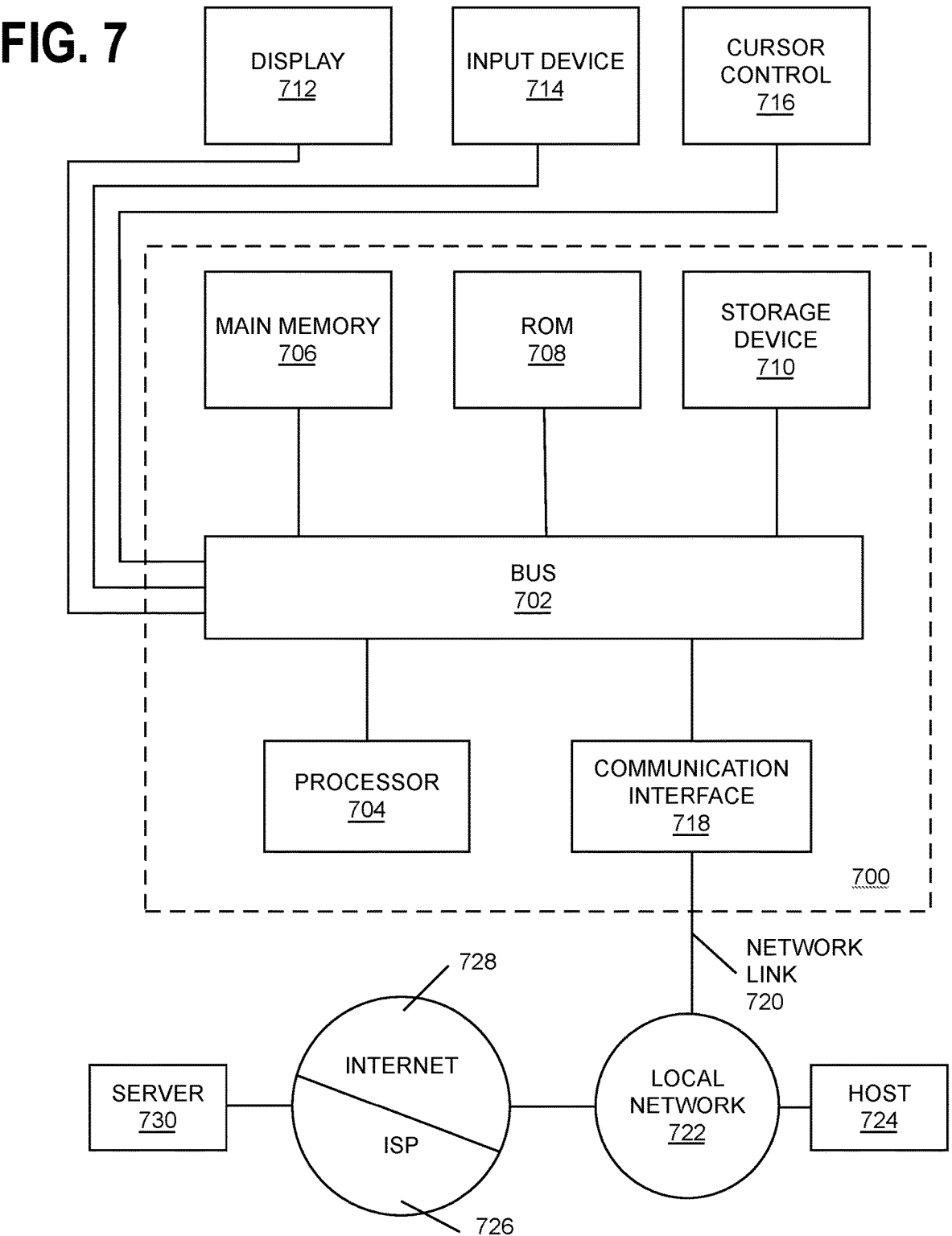

APPLYING A MACHINE LEARNING MODEL TO GENERATE A RANKED LIST OF CANDIDATE ACTIONS FOR ADDRESSING AN INCIDENT

TECHNICAL FIELD

The present disclosure relates to addressing incidents by providing relevant context and recommending actions to a user.

BACKGROUND

When a customer of an organization experiences an issue or incident, it is commonplace for the customer to contact the organization for help in resolving the incident. In this situation, a service agent at the organization will receive the customer's inquiry that describes the incident, such as via telephone, email, text, chat, etc. The service agent will attempt to ascertain an identity of the customer, an extent of the incident, what systems or products are being affected by the incident, etc. The service agent typically aims to quickly resolve the customer's issues by providing timely and accurate information to overcome the incident.

Frequently, data and processes that are designed to extract data relevant to customer issues are stored in systems external to the system used by the service agent. This adds another layer of complexity to present relevant data to service agents in an easily consumable format, often requiring custom development of communication code, service authentication code, and user interface components.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 shows a block diagram that illustrates a computer system in accordance with one or more embodiments.

DETAILED DESCRIPTION

Figure 1:
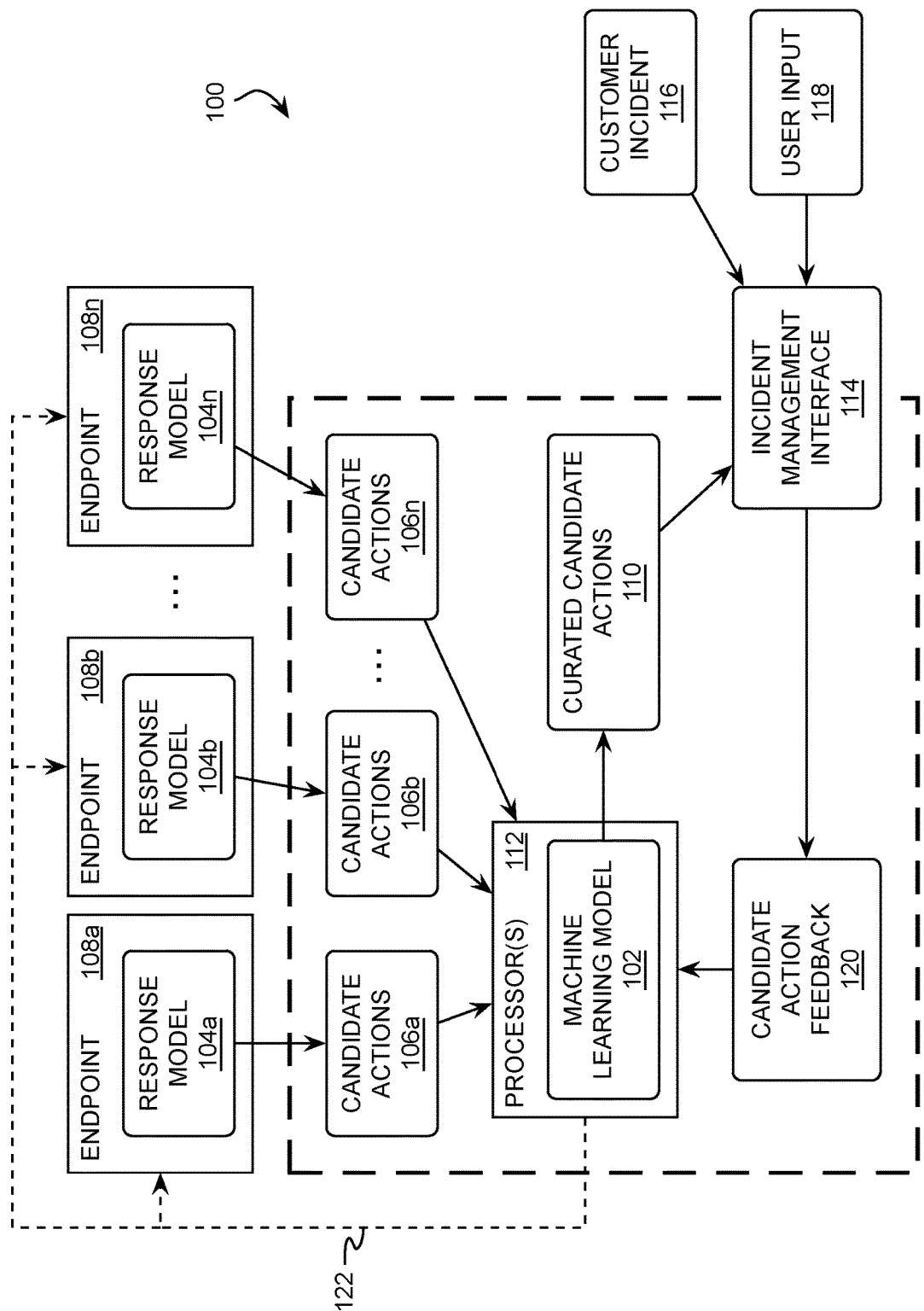
FIG. 1 illustrates a system for resolving customer incidents in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MACHINE LEARNING
4. PROVIDING CANDIDATE ACTIONS TO RESOLVE A CUSTOMER INCIDENT
5. EXAMPLE EMBODIMENTS
6. COMPUTER NETWORKS AND CLOUD NETWORKS
7. HARDWARE OVERVIEW
8. MISCELLANEOUS; EXTENSIONS

1. GENERAL OVERVIEW

A system obtains a set of candidate actions for addressing a target customer incident. The system may obtain the set of candidate actions from a variety of user-defined Representational State Transfer (REST) endpoints. The variety of user-defined endpoints may return candidate actions that are determined using disparate Artificial Intelligence (AI) platforms and analyses. Accordingly, the candidate actions, received from the variety of user-defined endpoints, may vary in content, action type, and display format. One or more embodiments apply a machine learning model to the obtained set of candidate actions to generate a ranked list of the candidate actions for presentation to a user. The machine learning model ranks the set of candidate actions based, for example, on actions previously taken to address the customer incidents. The system may select a uniform display format for presenting a set of candidate actions based on characteristics associated with individual candidate actions in the set of candidate actions. In an example, the system may modify a display format corresponding to at least one of the candidate actions, in the set of candidate actions, to generate a presentation having a uniform display format for the set of candidate actions.

One or more embodiments described in this Specification and/or recited in the claims may not be included in this General Overview section.

2. SYSTEM ARCHITECTURE

In one or more embodiments, a customer incident response system described herein allows customer service centers, call centers, support centers, etc., to leverage a data ecosystem available to provide service agents with contextually relevant insights into a current data context that describes the customer incident. The system allows an administrator to configure connections to endpoints for external and/or third-party services, including artificial intelligence (AI), machine learning, and other logic engines. An external service may also include static content, temporally based content, rules-based content, etc.

Once configured, the system displays a series of interface elements (e.g., cards) displayed along a bottom, a top, or on a sidebar adjacent to the service agent's incident workspace in one or more embodiments. Each interface element may have an associated action that the service agent may execute by selecting an area on the card (e.g., a button). The system facilitates custom Human-in-the-loop (HITL) artificial intelligence systems where the power of external AI engines is leveraged to generate insights and potential next actions, while the service agent is still in the loop and is responsible for acting upon those insights. The service agent validates appropriateness of the provided insights and delivers an authentic personal interaction to the customer.

Moreover, the ease with which the external services can be integrated into the system is unparalleled, and allows for many different sources and types of external services to be aggregated together, analyzed, and selectively displayed to the service agent. When the service agent opens a customer incident inquiry, one or more endpoints may be called, such as by using a specific Open API format, and relevant information from the customer incident is passed to the called endpoint(s). Each endpoint may return insight(s) based on the passed-in data, which the system uses to display insight cards in a vicinity of the incident workspace. Each insight may include an associated action that the agent may execute by clicking an area of the insight card. Service agents may dismiss any insights that are determined to be unhelpful. The acceptance and dismissal actions on the insight cards are returned to the external service from which they were provided, facilitating training of the individual services.

One or more embodiments avoids expensive custom development, provides a secure connection to the external services, and the presentation of the external service data is consistent with the rest of the application regardless of how many external services are called.

FIG. 1 illustrates a system 100 for resolving customer incidents in accordance with one or more embodiments. As illustrated in FIG. 1, system 100 includes one or more processors 112 configured to apply a machine learning model 102 that helps to resolve customer incidents. Machine learning model 102 is configured to curate candidate actions 110 for presentation to a person capable of resolving customer incidents (e.g., a service agent at an organization who responds to customer inquiries), such as customer incident 116. The customer incident 116 may be included in and/or described by user input 118, in an embodiment. User input 118 may be provided to a service agent using an incident management interface 114 in one embodiment. For example, a user may submit an inquiry online through a website, and upon submitting the inquiry, information from the inquiry may be gathered together to create attributes associated with customer incident 116, which are displayed to the service agent through the incident management interface 114. Moreover, the attributes associated with the customer incident 116 are provided to processor(s) 112, in one approach, so that the processor(s) 112 can apply machine learning model 102 to help resolve the customer incident 116.

In another approach, customer incident 116 may be generated, propagated, modified, and/or passed through one or more systems prior to arriving at system 100 to be worked on by a service agent. For example, service agent trainees may be trained on how to resolve customer incidents on system 100. In this example, simulated customer incidents may be provided to the service agent trainee in order to train and improve the skills of the service agent trainee in dealing with customer incidents of various types.

In another approach, the service agent may enter details and attributes of the customer incident 116, such as via the incident management interface 114 or some other interface available to the service agent. Once the service agent enters the information, a service ticket may be generated and sent to the processor(s) 112 for further processing, such as by applying the machine learning model 102 in one embodiment. In an example, at a call center, a service agent may receive a telephone contact from a customer, who describes the issue and relevant information, which the service agent may enter through the incident management interface 114.

Processor(s) 112 provides details of the customer incident 116, obtained from the user input 118 and/or some other component of system 100, to at least one of a plurality of endpoints 108 (e.g., endpoint 108a, endpoint 108b, . . . , endpoint 108n). Each externally-sourced endpoint 108 respectively runs at least one response model 104 (e.g., response model 104a, response model 104b, . . . , response model 104n). Each response model 104 is configured to take a customer incident 116 and attributes associated with the customer incident 116 as input, and output one or more candidate actions 106 (e.g., candidate actions 106a, candidate actions 106b, . . . , candidate actions 106n) designed to address the particular customer incident 116. It is hoped that at least one of these candidate actions 106 will resolve the customer incident in a satisfactory manner for the customer (e.g., fix a software issue or bug, overcome a compatibility issue between hardware and software, cause functioning to improve, alleviate the customer's dissatisfaction with a discount or monetary award, etc.).

In one or more embodiments, machine learning model 102 may determine which endpoints 108 to request candidate actions 106 from. This determination may be refined and optimized based on candidate action feedback 120 that describes which candidate actions are actually selected by the service agent, along with a measure of how successful a selected candidate action was in resolving the underlying customer incident 116.

Selection of a candidate action indicates that the service agent believed that the action would help to resolve the customer incident 116, and therefore is a good indication of the candidate action being relevant to the customer's issue. The success of an action in resolving an incident may be measured using any statistical measure when presented with a similar type of customer incident. Some example measures include, but are not limited to, a frequency of action selection, how commonly the action is the only one selected by the service agent, whether a customer reaches out with a follow-up issue after an action is selected, a survey filled out by the customer after an action has been selected, etc.

The candidate action feedback 120 and/or other relevant information may be provided to one or more of the endpoints 108 to be used to refine and improve the response models 104 resident therein, in one embodiment. The candidate action feedback 120 may be provided to the endpoints 108 via a secure remote connection 122, in one approach.

In an approach, attributes associated with a customer incident 116 may include any description or state of an interface that is displayed when a customer indicates an issue, such as a URL and state information for a webpage that the customer is currently navigated to when indicating the issue. Moreover, attributes associated with the customer incident 116 may include date of incident, time of incident, user input (text, images, logs, etc.) describing the problem that the customer is experiencing, service agent input (text, images, logs, etc.) describing the problem that the customer is experiencing, operating system (OS) version of customer device, application(s) currently running on customer device, application(s) version, customer name, customer organization, support plan level (for customers who subscribe to a particular service plan designed to address software/hardware issues at a customer site), tabs or windows open on browser of customer device, etc.

In one or more embodiments, endpoints 108 may be specified by an administrator or some other authorized user of system 100. The information included for a particular endpoint 108 may include address or location information, required authentication information for access to the response model 104, a name, a purpose, etc. For example, the information may specify a uniform resource locator (URL) and username/password combination that allows machine learning model 102 to access the response model 104 on a specific endpoint 108 remotely (such as over a secure connection).

Each response model 104 can recognize various aspects and characteristics of a customer incident (e.g., attributes associated with the customer incident) in order to suggest actions to take by a service agent who is responding to the customer incident 116. Some example actions include, but are not limited to: a) helping to resolve the customer incident 116, b) gathering more information about the customer incident 116 so that it can be further analyzed, c) alleviating customer dissatisfaction associated with the customer incident 116, d) providing information and/or context that describes why customer incident 116 is normal, etc. Multiple different actions 106 may be suggested for any particular customer incident 116, in various approaches, as there is not always one way or even one best or better way to resolve an issue. In addition, each customer may expect or appreciate a different way of addressing the same customer incident 116, and therefore multiple candidate actions 106 may be provided to the service agent who may be in a better position to determine which action may better resolve the customer incident 116.

In one or more embodiments, machine learning model 102 analyzes the customer incident 116 and attributes associated with the customer incident 116 to determine which endpoint 108 should be consulted to obtain candidate actions 106 to resolve the customer incident 116. Machine learning model 102 may determine that multiple endpoints 108 should be consulted, and requests for candidate actions 106 based on different response models 104 may be sent out to a plurality of endpoints 108.

In response to providing the customer incident 116 and attributes associated with the customer incident 116 to one or more endpoints 108, machine learning model 102 is provided a plurality of candidate actions 106 (e.g., from one or more endpoints 108) that may help to resolve a particular customer incident 116. Processor(s) 112 may receive the candidate actions 106 and apply machine learning model 102 to analyze the various candidate actions 106 in an approach. Machine learning model 102 analyzes the plurality of candidate actions 106 in order to determine which will most likely resolve the customer incident 116 to generate a curated set of candidate actions 110. The curated candidate actions 110 are displayed to the incident management interface 114, such as via processor(s) 112, for use by a service agent handling the customer incident 116.

To display the curated candidate actions 110, processor(s) 112 may choose a display format for each of the various candidate actions 110 that are displayed, in order to ensure that the content of the candidate action 110 can be understood by the service agent. Any suitable format for a candidate action may be selected, such as an ordered list, an audio playback element, a video playback element, a thumbnail image, a frame, and a grid. In one example, an audio playback element may appear as a play button, a slider control indicating a total length of the audio content, and a current playback position disposed upon the slider control. An example video playback element may appear as a video, where selection of the video causes playback to begin and pause. An example frame may include two or more entries arranged in a structured way that allows for greater comprehension of the information being related. An example grid represents groups of information in an organized fashion having columns and rows.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in the section titled "Computer Networks and Cloud Networks."

In one or more embodiments, a data repository may be included in system 100. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as processor(s) 112. Alternatively or additionally, a data repository may be implemented or executed on a computing system separate from processor(s) 112. The data repository may be communicatively coupled to system 100 via a direct connection or via a network.

In one or more embodiments, processor(s) 112 refers to hardware and/or software configured to perform operations described herein for providing curated candidate actions to a service agent for resolving a customer incident 116. Examples of operations for providing curated candidate actions for resolving a customer incident are described below with reference to FIGS. 4-6.

In an embodiment, system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, incident management interface 114 refers to hardware and/or software configured to facilitate communications between a service agent and machine learning model 102 for obtaining candidate actions to resolve the customer incident 116. Incident management interface 114 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of incident management interface 114 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, incident management interface 114 is specified in one or more other languages, such as Java, C, or C++.

In one or more embodiments, a tenant is a corporation, organization, enterprise or other entity that accesses a shared computing resource, such as system 100. In an embodiment, tenants are independent from each other. A business or operation of one tenant is separate from a business or operation of another tenant, and their access to system 100 is securely partitioned to avoid unauthorized access of information.

3. MACHINE LEARNING

Figure 2:
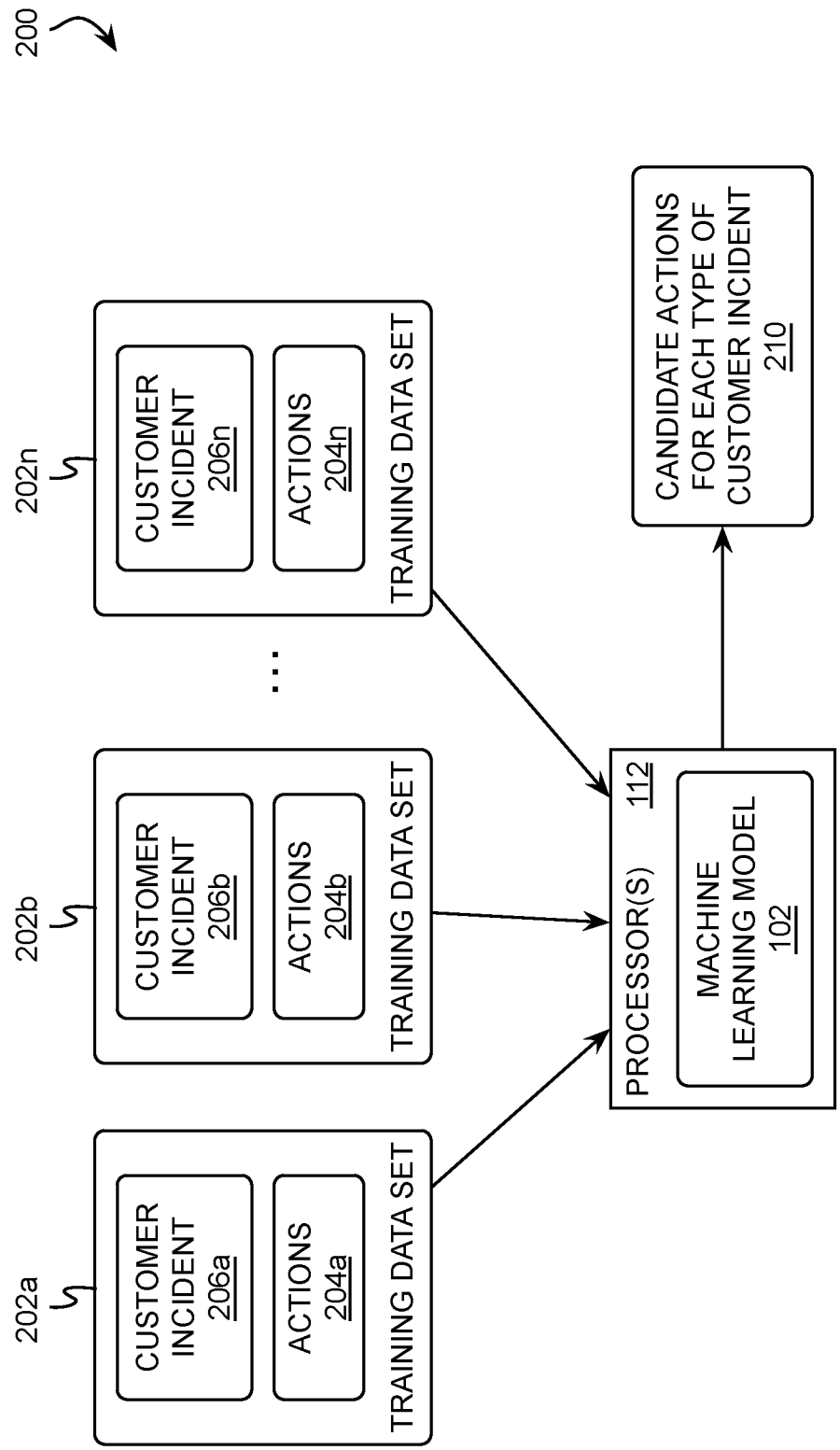
FIG. 2 illustrates training a machine learning model in accordance with one or more embodiments.

FIG. 2 illustrates training machine learning model 102 in accordance with one or more embodiments. In an embodiment, a machine learning algorithm is an algorithm that can be iterated to learn a target model f that best maps a set of input variables to an output variable and provides a desired output when provided with certain input types. In particular, a machine learning algorithm is configured to generate and/or train machine learning model 102 to select endpoints for obtaining candidate actions, and curating candidate actions to present in an incident management interface.

The machine learning algorithm can be iterated to learn target model f that best maps a set of input variables to an output variable using training data sets 202 (e.g., training data set 202a, training data set 202b, . . . , training data set 202n). The training data sets 202 each include a customer incident 206, actions 204 to resolve the customer incident, and associated labels. The training data sets 202 are associated with input variables for the target model f. The associated labels are associated with the output variable of the target model f. The training data sets 202 may be updated based on, for example, feedback on the accuracy of the current target model f. Updated training data sets 202 are fed back into the machine learning algorithm, which in turn updates the target model f used in machine learning model 102.

A machine learning algorithm generates a target model f such that the target model f best fits the training data sets 202 to the labels. Additionally or alternatively, a machine learning algorithm generates a target model f such that when the target model f is applied to the training data sets 202, a maximum number of results determined by the target model f matches the labels. Different target models may be generated based on different machine learning algorithms and/or different training data sets 202.

Once the machine learning model 102 is trained, processor(s) 112 are able to apply the machine learning model 102 to provide candidate actions for each type of customer incident 210 for which training data sets 202 were provided during training. Should a new or different type of customer incident be encountered, a training data set 202 may be created that describes the customer incident and the machine learning model 102 may be trained using this updated training data set so that it can recognize this customer incident type in the future.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

4. PROVIDING CANDIDATE ACTIONS TO RESOLVE A CUSTOMER INCIDENT

Figure 3:
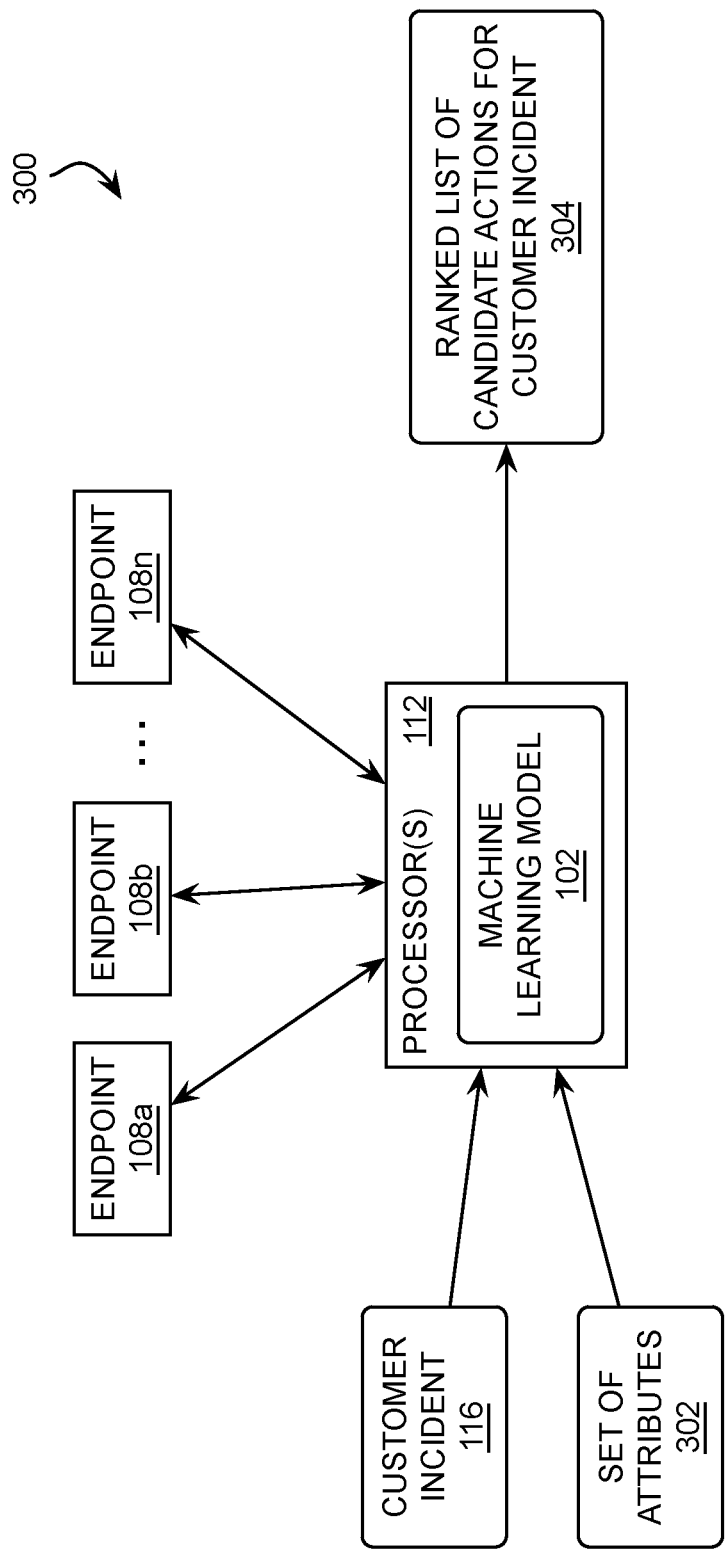
FIG. 3 illustrates use of a machine learning model to provide a ranked list of candidate actions for resolving a customer incident, in accordance with one or more embodiments.

FIG. 3 illustrates use of a machine learning model 102 to provide a ranked list of candidate actions for resolving a customer incident 306, in accordance with one or more embodiments. One or more processors 112 are configured to manage and apply machine learning model 102, in one or more embodiments. The processor(s) 112 receive and/or obtain a customer incident 116 which is associated with a set of attributes 302. The set of attributes 302 associated with the customer incident 102 may describe any aspect of the customer, the customer incident 116, hardware platform, software platform, product type, etc. In an approach, the set of attributes 302 associated with the customer incident 116 may include any description or state of an interface that is displayed when a customer indicates an issue, such as a URL and state information for a webpage that the customer is currently viewing when indicating and/or issuing an incident and/or help request.

In one or more embodiments, the set of attributes 302 associated with the customer incident 116 may include date of incident, time of incident, user input (text, images, logs, etc.) describing the problem that the customer is experiencing, service agent input (text, images, logs, etc.) describing the problem that the customer is experiencing, OS version of customer device, application(s) currently running on customer device, application(s) version, customer name, customer organization, support plan level (for customers who subscribe to a particular service plan designed to address software/hardware issues at a customer site), tabs or windows open on browser of customer device, etc.

Upon receiving the customer incident 116 and associated set of attributes 302, The processor(s) 112 apply the machine learning model 102 to identify a plurality of endpoints 108 for obtaining candidate actions for addressing the customer incident 116. Machine learning model 102 may identify which of the endpoints 108 will be used to retrieve candidate actions, and this determination may be based on information available to machine learning model 102. Some example information includes, but is not limited to, historical performance of candidate action suggestions from the various endpoints 108, a type of customer incident (certain endpoints 108 may provide candidate actions that are better suited to respond to particular type(s) of customer incidents), an identity of the customer, availability of one or more of the endpoints 108, speed of acquiring the candidate actions, characteristics of candidate actions previously retrieved from a particular endpoint 108, etc.

For example, if endpoint 108a provides historically better performing candidate actions than endpoint 108b, then candidate actions may be requested from endpoint 108a instead of endpoint 108b. In another example, if endpoint 108a provides historically better performing candidate actions than endpoint 108b, then candidate actions may first be requested from endpoint 108a, and if insufficient candidate actions are obtained form endpoint 108a, then candidate actions will be obtained from endpoint 108b (e.g., priority is given to obtaining candidate actions from endpoints 108 that have provided historically better performing candidate actions).

Once processor(s) 112 apply the machine learning model 102 to select which endpoints 108 to obtain candidate actions from, the processor(s) 112 execute commands to obtain, from each of the selected endpoints 108, a respective subset of a plurality of candidate actions for addressing the customer incident 116.

The processor(s) 112 may apply machine learning model 102 to further identify characteristics of the plurality of candidate actions obtained from the selected endpoints 108 to generate and/or obtain a ranked list of candidate actions 304, with the candidate action determined to be most likely to resolve the customer incident 116 at one extent of the list (e.g., at the top of the list), and candidate actions determined to be less likely to resolve the customer incident 116 being presented toward the other extent of the list (e.g., lower in the list).

Thereafter, the processor(s) 112 present, on a display device, at least a portion of the ranked list of candidate actions 304 for addressing the customer incident 116. The display device may present candidate actions in a standardized interface, such as a customer incident management interface, where a service agent will be able to anticipate where the candidate actions will be presented, and how to interact with the candidate actions (select, playback, drag, tap, etc.).

In a further approach, the processor(s) 112 may select a display format for displaying the ranked list of candidate actions based on characteristics identified from the candidate actions.

The display format may include a text description that describes what the candidate action will do if selected by the service agent, such as a function that will be performed, e.g., copy, paste, contact someone (via email, phone, etc.), generate a report with attributes 302 of the customer incident 116, issue a coupon, issue a refund, refer customer incident 116 to another service or support agent, retrieve additional documentation regarding the customer incident 116 (user manual, installation manual, operating system requirements, etc.), display a set of ordered steps to resolve the customer incident 116, etc.

In one or more embodiments, each candidate action may have a display format chosen that is specific to the candidate action. Some example display formats include, but are not limited to, an ordered list, an audio playback element, a video playback element, a thumbnail image, a frame, and a grid.

The various candidate actions may be displayed to the incident management interface consistently in the same location or area. This location or area may be set by a user of the incident management interface in one approach, or defaulted to a specific location in another approach. In one example, the candidate actions may be displayed to the incident management interface as a series of interface elements (e.g., cards) that are shown along a bottom of the display screen adjacent to the service agent's incident workspace. In another example, the candidate action cards may be shown along a top of the display screen adjacent to the service agent's incident workspace. In an example, the candidate action cards may be shown on a sidebar (left or right placement) adjacent to the service agent's incident workspace. In yet another example, the candidate action cards may be displayed in a pop-up or overlay window on top of the service agent's incident workspace, moveable about the display screen by user input.

5. EXAMPLE EMBODIMENTS

Detailed examples are described below for purposes of clarity. Components and/or operations described below should be understood as being in specific examples which may not be applicable to certain embodiments. Accordingly, components and/or operations described below should not be construed as limiting the scope of any of the claims.

Figure 4:
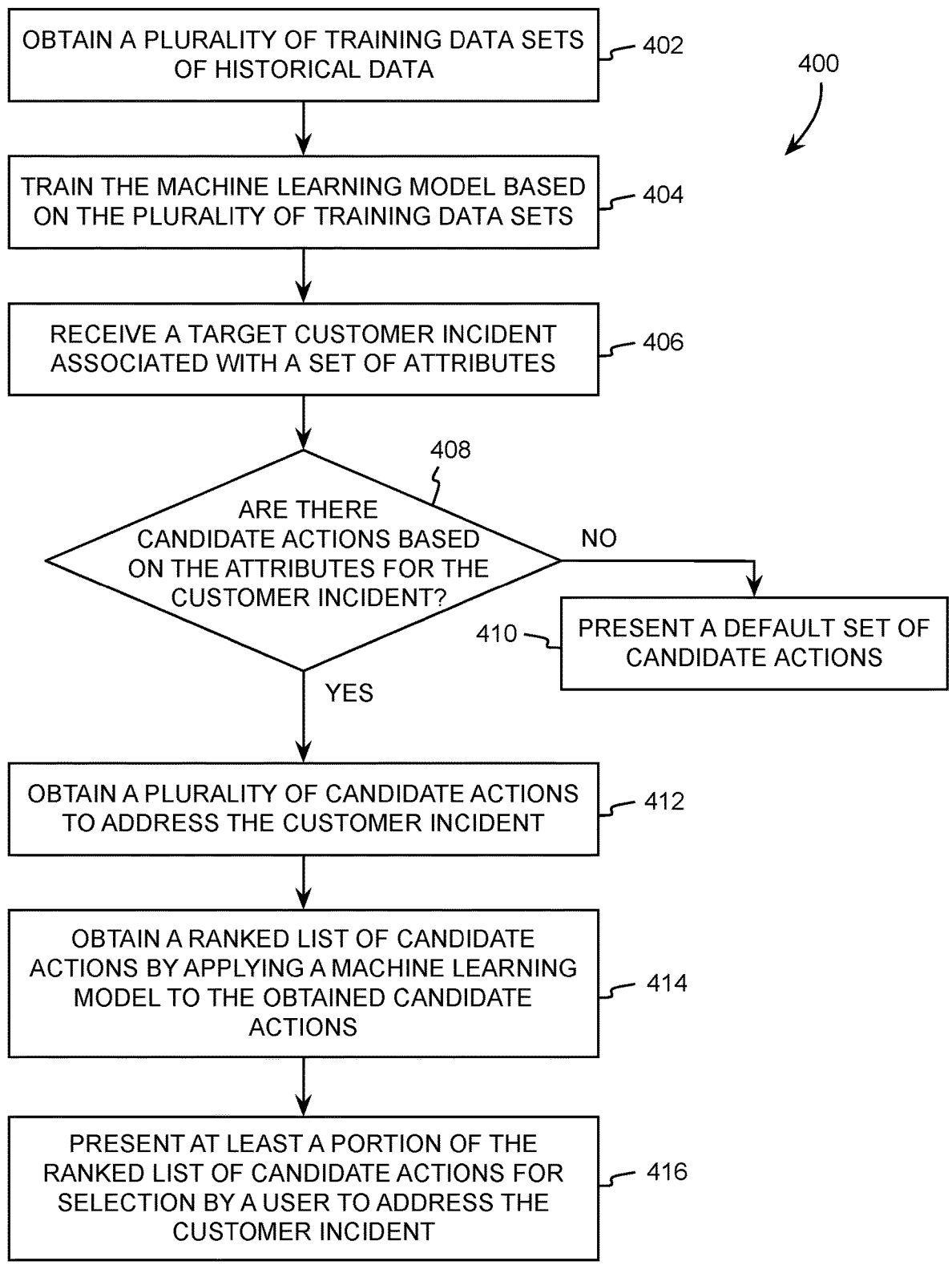
FIG. 4 illustrates an example set of operations for training a machine learning model to provide candidate actions for resolving a customer incident in accordance with one or more embodiments.

FIG. 4 illustrates an example set of operations for training a machine learning model to provide candidate actions for resolving a customer incident in accordance with one or more embodiments. The set of operations are collectively referred to as method 400. One or more operations illustrated in FIG. 4 may be modified, rearranged, or omitted all together. Accordingly, the particular sequence of operations illustrated in FIG. 4 should not be construed as limiting the scope of one or more embodiments. For the remainder of the descriptions of method 400, the operations will be described as being performed by a processor. However, any hardware, software, or combination thereof may be used to perform method 400 in various embodiments.

The processor trains a machine learning model to rank candidate actions for addressing customer incidents in one or more embodiments. To achieve this training, the processor obtains a plurality of training data sets of historical data in Operation 402. Each training data set includes attributes of a particular customer incident, the particular customer incident being one of many probable customer incidents. Each training data set further includes one or more actions taken to address the particular customer incident. The training data sets may also include data labels associated with portions of the training data sets to be learned by the machine learning model in one approach.

Moreover, the machine learning model may be trained to identify the candidate actions that are capable of addressing customer incidents in one or more embodiments. Identification of possible candidate actions may be accomplished by presenting various different candidate actions to the machine learning model in the training data sets. In one or more embodiments, metadata may be included with the candidate actions that indicates characteristics of the candidate actions, such as type of action, display format, content, etc.

The candidate actions may be of different types, use different display formats, and/or include different content in one or more embodiments. Example types of actions include, but are not limited to, delete, copy, paste, following a link, speaking or writing a statement to a customer, speaking or writing a question for the customer to gather more information, issue a coupon, remotely control the customer's system, transmit data and/or an application to the customer, issue a refund to the customer, provide a discount to the customer, etc. Examples of different display formats include, but are not limited to, a list, a grid, an embedded image or thumbnail image, an embedded video player, an embedded audio player, a text box, a hyperlink, a pop-up window, a tab, a frame, etc. Examples of different content that may be included in the candidate action include, but are not limited to, a text description, instructions, user manual, instruction manual, compatibility information, an image, a video, audio, etc.

In one embodiment, a particular training data set, of the plurality of training data sets, may include a ranked list of actions taken to address the customer incident, so that the machine learning model is able to learn which candidate actions are most likely to resolve the customer incident without excluding less likely actions from the set of candidate actions that can be provided to the processor.

The processor trains the machine learning model based on the plurality of training data sets in Operation 404. This training may include an iterative process of exposing the machine learning model to the training data sets, measuring a response and/or output of the machine learning model, comparing the response and/or output to a desired response, adjusting one or more parameters and/or characteristics of a machine learning algorithm underlying the machine learning model, and repeating the training until convergence on the desired response is achieved.

Once the machine learning model is trained, the processor receives a target customer incident associated with a set of attributes in Operation 406. The processor determines whether the machine learning model includes candidate actions that may resolve the customer incident based on the set of attributes associated with the customer incident. For example, if the machine learning model is trained to resolve customer issues with software, and the customer incident is concerned with an amount being billed to the customer, it can be concluded that a resolution will not be provided by the system in its current configuration.

In another example, if the attributes indicate that the customer incident involves attributes for which the machine learning model has not been specifically trained (e.g., it was trained for a Microsoft Windows® OS, but the attributes indicate that the customer incident occurred while using a LINUX® OS), the processor may determine that candidate actions specific to the Microsoft Windows® OS may not resolve the customer incident in the LINUX® OS. This may be due to one or more commands that are available in the Microsoft Windows® OS not being available in the LINUX® OS, and vice versa.

In response to the processor determining that the machine learning model does not include candidate actions to resolve the customer incident, a default set of actions may be presented by the processor in Operation 410. This default set of operations may include general actions that may be tried that are not platform-specific, not software-specific, do not require specialty functionality of a particular application or OS, etc. One or more example default actions are to reboot a system, perform a hard reset, defer the customer incident to a different support or service agent who deals with the specific combination of features, etc.

The processor obtains a plurality of candidate actions to address the target customer incident based on the set of attributes associated with the target customer incident in Operation 412. The candidate actions are obtained from one or more externally-sourced endpoints in an approach. The processor may apply the trained machine learning model to determine which endpoints to use to acquire the candidate actions in one or more embodiments.

The processor applies the trained machine learning model to the obtained candidate actions to generate a ranked list of candidate actions in Operation 414. Prior to, in conjunction with, or after applying the trained machine learning model, the processor may apply one or more additional logic operations to perform at least a portion of ranking the candidate actions. In other words, one or more additional layers of logic may exist between the machine learning model and producing the ranked list of candidate actions, such as proprietary logic for specific customers, a rules-based model, a sort function, a filter function, etc.

The processor places candidate actions determined to be more relevant and/or having a greater chance of resolving the customer incident in the ranked list at one end, and less relevant and/or less successful candidate actions being placed at the other end of the list in one embodiment.

The processor presents at least a portion of the ranked list of candidate actions for addressing the target customer incident in Operation 416. The portion of the ranked list may be presented on a display device, in one embodiment. In another embodiment, the ranked list may be presented audibly (e.g., using a screen reader function), using a braille printer, or via some other presentation technique. The portion chosen to be displayed includes those candidate actions determined to be most relevant and/or most likely to resolve the customer incident in an approach.

The processor may present the ranked list in accordance with one or more format types suitable for presentation of the various candidate actions included in the ranked list in one or more embodiments.

According to one or more embodiments, the processor may obtain the candidate actions to address the target customer incident by identifying multiple different user-defined representational state transfer (REST) endpoints and executing a command to pull subsets of the candidate actions from the various user-defined REST endpoints. These REST endpoints may be configured by a user of the incident management interface by inputting information into a form that includes a set of predefined fields, so that candidate actions may be retrieved from a REST endpoint at a later time when useful to resolve a customer incident.

Upon receiving user input selecting a candidate action from the set of candidate actions displayed in the incident management interface, the machine learning model may be updated based on the set of attributes associated with the target customer incident and selection of the candidate action in one or more embodiments. In other words, feedback to the machine learning model may be provided each time one of the candidate actions is selected in the incident management interface, thereby allowing the machine learning model to provide more accurate and relevant candidate actions for future customer incidents, that are also more likely to resolve the customer incident in a minimum number of steps for the service agent.

In one or more embodiments, upon receiving user input selecting a candidate action from the set of candidate actions displayed in the incident management interface, the processor may update the incident management interface. Any type of update may be performed including, but not limited to, adding content, removing content, modifying content, following a selected link to another page, generating a communication (e.g., email, text message, tweet, etc.), filling out a form with information available to the machine learning model, etc.

In one example, the incident management interface may be updated by performing the candidate action and removing an interface element (e.g., a card) corresponding to the candidate action from a group of interface elements respectively representing the displayed candidate actions selected for addressing the target customer incident.

In an example, the incident management interface may be updated by modifying and/or updating the displayed candidate actions, including adding a new candidate action based on the selected candidate action, modifying the selected candidate action based on interaction with the candidate action, e.g., removing functionality, adding functionality, changing text, displaying user input, requesting follow-up information, providing a follow-up action, etc.

Figure 5:
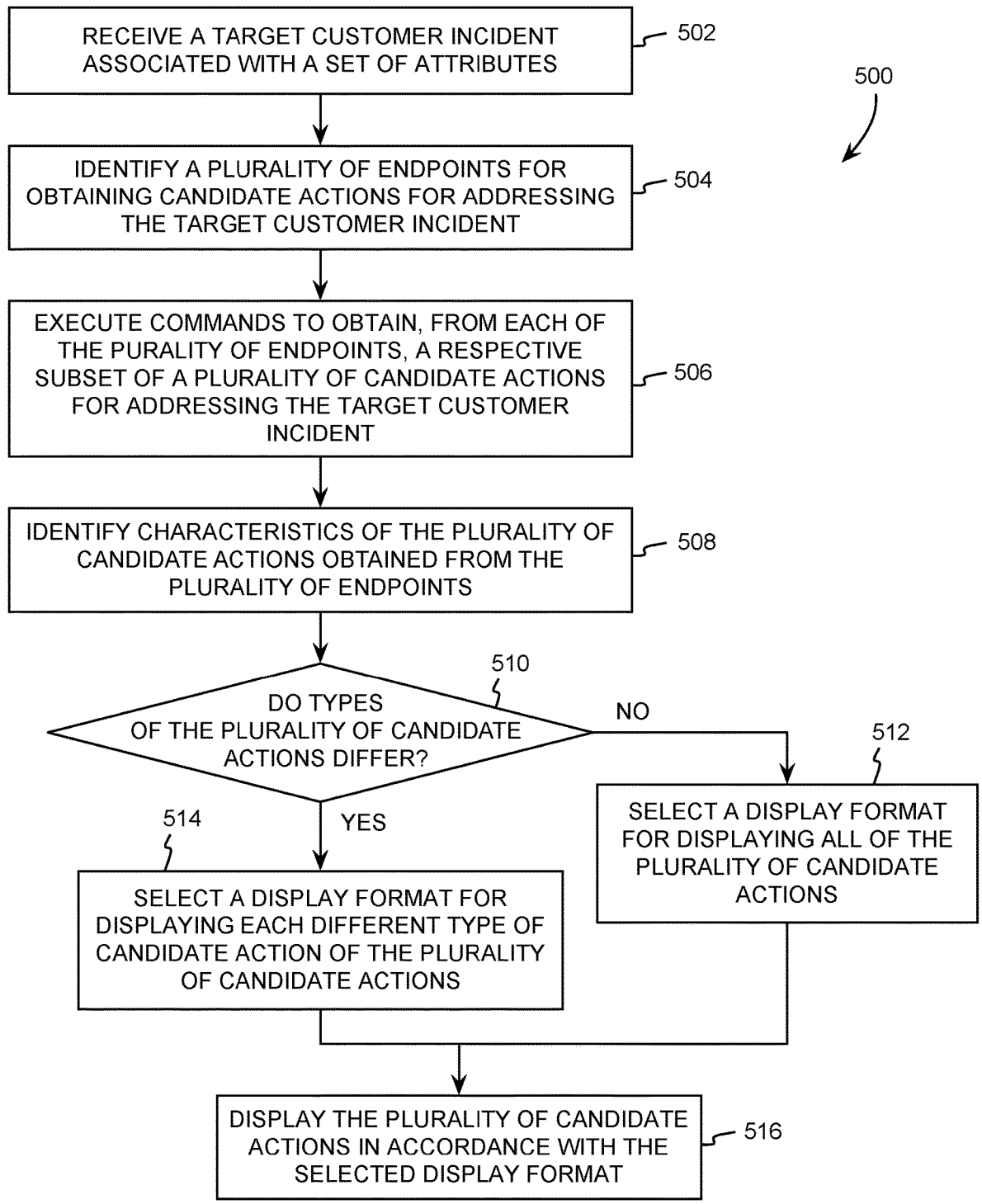
FIG. 5 illustrates an example set of operations for providing candidate actions for resolving a customer incident in accordance with one or more embodiments.

FIG. 5 illustrates an example set of operations for providing candidate actions for resolving a customer incident in accordance with one or more embodiments. The set of operations are collectively referred to as method 500. One or more operations illustrated in FIG. 5 may be modified, rearranged, or omitted all together. Accordingly, the particular sequence of operations illustrated in FIG. 5 should not be construed as limiting the scope of one or more embodiments. For the remainder of the descriptions of method 500, the operations will be described as being performed by a processor. However, any hardware, software, or combination thereof may be used to perform method 500 in various embodiments.

The processor receives a target customer incident associated with a set of attributes in Operation 502. As previously described, the set of attributes may describe any aspect of the customer, customer incident, hardware platforms, software platforms, etc. The target customer incident may be submitted to the processor via a submission module on a website in one embodiment. In another embodiment, a service agent may collect the attributes through communications with the customer, such as via chat, telephone, email, etc.

The processor identifies a plurality of endpoints for obtaining candidate actions for addressing the target customer incident in Operation 504. A machine learning model may be used to determine which endpoint should be used to obtain candidate actions in one embodiment. In another approach, all endpoints which have been configured in the system may be consulted in obtaining the candidate actions for addressing the target customer incident, and the machine learning model may filter, sort, and/or analyze the received candidate actions prior to displaying them for interaction with the service agent.

The processor obtains, from each of the plurality of endpoints, a respective subset of a plurality of candidate actions for addressing the target customer incident in Operation 506. The processor may obtain these candidate actions by executing commands, with the commands being based on configuration of the various endpoints on the system, e.g., commands to access REST endpoints.

In Operation 508, the processor identifies characteristics of the plurality of candidate actions obtained from the plurality of endpoints. These characteristics may include any defining feature of the candidate action, such as type of action (information to provide, information to request, executable, etc.), content associated with the action (video element, text element, link, audio element, inquiry for the customer, information to provide the customer, etc.), data size of the action, play length for the action, title of the action, etc.

The processor determines whether all of the candidate actions are of the same type (and would utilize the same display format) in Operation 510. For example, an action to present a link for selection by the service agent is different from an action for collecting additional information from the customer, and would therefore use a different display format.

When all candidate actions are of the same type, the processor selects a display format for displaying the plurality of candidate actions based on the identified characteristics of the plurality of candidate actions in Operation 512.

When at least two of the candidate actions are of a different type (e.g., image versus audio clip), the processor selects a display format for each of the candidate actions individually in Operation 514 based on the identified characteristics of the plurality of candidate actions. Thereafter, the processor may further determine how all of the different display formats may be presented together in the incident management interface.

In this way, when the candidate actions are displayed, each is presented in a format that is suitable for the individual candidate action. Some example display formats have been previously described, and are applicable to Operations 512 and 514 as well.

The processor displays the plurality of candidate actions in accordance with the selected display format(s) in Operation 516. The plurality of candidate actions may be displayed to the incident management interface consistently in the same location or area in accordance with their selected display format(s). This location or area may be set by a user of the incident management interface in one approach. The specific location may be predetermined in another approach. In yet another approach, the location may be based on the selected display format(s) for the plurality of candidate actions.

In one example, the plurality of candidate actions may be displayed to the incident management interface as a series of interface elements (e.g., cards) that are shown along a bottom of the display screen adjacent to the service agent's incident workspace. In another example, the plurality of candidate action cards may be shown along a top of the display screen adjacent to the service agent's incident workspace. In another example, the plurality of candidate action cards may be shown on a sidebar (left or right placement) adjacent to the service agent's incident workspace. In yet another example, the plurality of candidate action cards may be displayed in a pop-up or overlay window on top of the service agent's incident workspace, moveable about the display screen by user input or automatically based on other displayed information in the incident workspace.

In one or more embodiments, the processor may display the plurality of candidate actions in accordance with the selected display format(s) by modifying at least one of the plurality of candidate actions for display in accordance with the selected display format. The modification may include shrinking a layout size, enlarging a layout size, condensing content (deleting text, making font smaller, reducing image size, etc.), expanding content (adding text, making font larger, increasing image size, etc.), etc.

In some approaches, prior to displaying the plurality of candidate actions, the processor may remove a first candidate action from the plurality of candidate actions based on the first candidate action being duplicative of a second candidate action retained in the plurality of candidate actions. In this way, the candidate actions displayed to the incident management interface will each be separately useable to perform a different action to address the customer incident without repeating any of the actions.

In one or more approaches, prior to displaying the plurality of candidate actions, the processor may sort subsets of the plurality of candidate actions based on a similarity criterion into one or more groups. The similarity criterion may include similarity between titles, sizes, content, sources, etc. For example, candidate actions that have a similar or the same title may represent similar candidate actions and would not be useful to the service agent if displayed separately. In another example, candidate actions that access similar or the same content may represent similar candidate actions. Once the plurality of candidate actions are sorted into groups (subsets), the processor displays a single interface element for each group of the plurality of candidate actions. In a further approach, selecting the single interface element will expand the group to reveal all the candidate actions included in the group. In a different approach, selecting the single interface element will execute the candidate action determined by the machine learning model to be most relevant and/or likely to resolve the customer incident.

In one or more embodiments, one or more display formats include a text description. In some approaches, display formats may take any suitable form for presenting a candidate action, such as an ordered list, an audio playback element, a video playback element, a thumbnail image, a frame, a grid, etc.

Method 500 may further include the processor receiving user input selecting and interacting with a candidate action of the plurality of candidate actions in the incident management interface. Responsive to receiving this selection, the processor modifies at least one of the plurality of candidate actions based on the selected candidate action. Some example modifications include, but are not limited to, adding a new candidate action, removing the selected candidate action, altering the selected candidate action based on interaction with the candidate action, etc.

Figure 6:
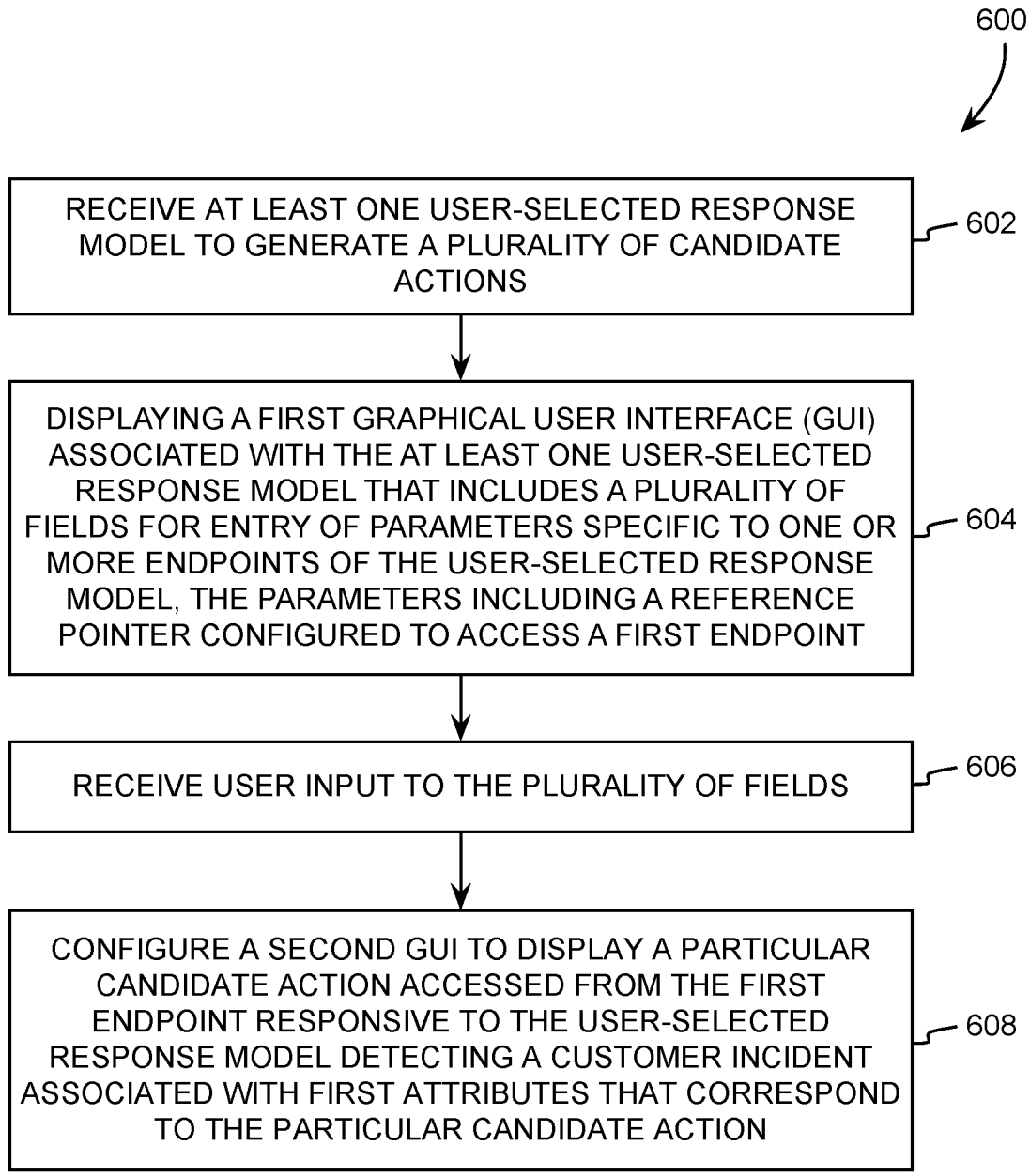
FIG. 6 illustrates an example set of operations for configuring an incident management interface with one or more user-provided response models in accordance with one or more embodiments.

FIG. 6 illustrates an example set of operations for configuring an incident management interface with one or more user-selected response models in accordance with one or more embodiments. The set of operations are collectively referred to as method 600. One or more operations illustrated in FIG. 6 may be modified, rearranged, or omitted all together. Accordingly, the particular sequence of operations illustrated in FIG. 6 should not be construed as limiting the scope of one or more embodiments. For the remainder of the descriptions of method 600, the operations will be described as being performed by a processor. However, any hardware, software, or combination thereof may be used to perform method 600 in various embodiments.

The processor receives at least one user-selected response model in Operation 602. Each user-selected response model includes logic configured to generate a plurality of candidate actions for resolving a customer incident. Each of the candidate actions correspond to a particular set of attributes associated with the customer incident, with each candidate action including content relevant to the customer incident, such as an action to take, information to relay to the customer, additional information to obtain from the customer, etc.

In Operation 604, the processor displays a first GUI associated with the user-selected response model(s). This first GUI includes a plurality of fields for entry of parameters specific to one or more endpoints of a particular user-selected response model. The parameters include at least a reference pointer configured to access a first endpoint for obtaining candidate actions to resolve future customer incidents. In one approach, the reference pointer may be a REST URL for the first endpoint.

In one or more approaches, the parameters specific to the user-selected response model may include any of the following: a name associated with the user-selected response model, a description of a purpose of the user-selected response model, selection of one or more profiles having access to the user-selected response model, authentication information for access to the user-selected response model, etc.

The processor receives user input to the plurality of fields in order to set up the endpoint(s) for the particular user-selected response model in Operation 606. This input may be provided using any input device or method, such as voice input from a customer or service agent, pointer device (e.g., mouse, trackball, touchpad, touchscreen, etc.), keyboard, motion detection, etc. All of the fields do not need to be filled out, but more information will allow the machine learning model to understand and learn capabilities for candidate actions obtained from any particular user-selected response model.

The ability to define metadata for multiple external REST endpoints, without the service agent or administrator who configures the machine learning model writing any code, provides a vastly improved interface and speeds up the process of configuring the system to respond to customer incidents with externally-sourced response model(s), such as those provided by the manufacturer or provider of the services, hardware, and/or software that will be used by the customers. Once the REST endpoints are configured in this uniform interface, they can be called dynamically by a service agent in a secure way. Candidate actions provided by the various REST endpoints can be aggregated, and selected candidate actions can be presented in one single standardized incident management interface.

The standardized structure of the REST endpoint call and candidate actions displayed to the incident management interface is also beneficial to the service agent, as they are able to access information from many disparate AI platforms and analyses provided therefrom without needing to be familiar with access methods, authentication credentials, address and/or location information, or interfacing requirements for each externally-sourced endpoint. In this way, the system can leverage proprietary data and processes owned, managed, and developed by the manufacturer or provider of the services, hardware, and/or software that will be used by the customers. This is possible without custom development of a communication layer, service authentication, and user interface components, thereby saving time and resources better spent on addressing customer incidents.

Based on the user input describing one or more user-selected response models, the processor configures a second GUI. This second GUI may be used in the incident management interface to allow a service agent to receive and respond to a customer incident, which may be submitted electronically to the incident management interface. The second GUI may include a service agent's incident workspace, in one or more embodiments, for managing and responding to customer inquiries and incidents. The processor is configured to display, within or in conjunction with the second GUI, interface elements (e.g., cards) representing candidate actions, with each card having a similar look and feel, with variances allowed for the content of the particular candidate action (e.g., type of candidate action) and/or settings of the system, e.g., where to display the cards, how to display the cards (transient, permanent, etc.).

In one embodiment, processor configures the second GUI to display a particular candidate action of the plurality of candidate actions accessed from the first endpoint (alone or with other candidate actions) responsive to the user-selected response model detecting a customer incident associated with first attributes that correspond to the particular candidate action. In other words, when a customer incident and attributes associated therewith are provided to the user-selected response model, and the user-selected response model analyzes the attributes and customer incident to determine that the particular candidate action should be used to respond to the attributes and customer incident, then the particular candidate action is displayed to the second GUI for use by the service agent.

In one or more embodiments, the content may include any of the following: descriptive text, selectable links, images, playable audio, graphical elements, etc.

According to some approaches, one or more of the user-selected response models hosted at one or more endpoints is a machine learning model configured to select one or more candidate actions to display in the second GUI based on detection of a particular set of attributes associated with a current customer incident, and improve future candidate action suggestions based on user interaction with candidate actions previously displayed in the second GUI.

In some approaches, one or more of the user-selected response models hosted at one or more endpoints includes a set of rules that indirectly specify a mathematical model that selects one or more candidate actions to display based on a particular set of attributes associated with a current customer incident. This is a rules-based model for providing candidate actions based on the circumstances and type of customer incident.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

8. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    receiving a target customer incident and an associated set of attributes;
    based on receiving the target customer incident and the associated set of attributes, obtaining a plurality of candidate actions to address the target customer incident;

wherein obtaining the plurality of candidate actions to address the target customer incident comprises:
identifying, using a trained machine learning model, one or more endpoints of a plurality of endpoints;
obtaining the plurality of candidate actions from the one or more endpoints of the plurality of endpoints;
obtaining feedback corresponding to the plurality of candidate actions, wherein the feedback includes an indication of a selected candidate action from the plurality of candidate actions; and
updating the trained machine learning model using the feedback corresponding to the plurality of candidate actions as training data;
wherein updating the trained machine learning model using the feedback corresponding to the plurality of candidate actions comprises retraining the trained machine learning model to select endpoints for obtaining candidate actions using the indication of the selected candidate action as training data.

2. The one or more non-transitory machine-readable media as recited in claim 1, wherein obtaining the plurality of candidate actions to address the target customer incident comprises:
identifying, using the trained machine learning model, a first user-defined representational state transfer (REST) endpoint and a second user-defined representational state transfer (REST) endpoint of a plurality of user-defined representational state transfer (REST) endpoints; and
executing a command to pull a first set of candidate actions from the first user-defined representational state transfer (REST) endpoint and a command to pull a second set of candidate actions from a second user-defined representational state transfer (REST) endpoint, wherein the plurality of candidate actions includes the first set of candidate actions and the second set of candidate actions.

3. The one or more non-transitory machine-readable media as recited in claim 1, wherein the instructions further comprise:
responsive to receiving user input for a selected candidate action, performing at least one of:
updating an incident management interface by performing the selected candidate action and removing an interface element, corresponding to the selected candidate action, from a plurality of interface elements respectively representing the plurality of candidate actions for addressing the target customer incident;
updating the plurality of candidate actions by adding a new candidate action based on the selected candidate action; or
updating the plurality of candidate actions by modifying the selected candidate action based on interaction with the selected candidate action.

4. The one or more non-transitory machine-readable media as recited in claim 1, wherein a particular training data set, of a plurality of training data sets used for retraining the trained machine learning model, includes a ranked list of actions taken to address the target customer incident.

5. The one or more non-transitory machine-readable media as recited in claim 1, wherein the instructions further comprise:
inputting the set of attributes into a first response model hosted at a first user-defined representational state transfer (REST) endpoint to obtain a first selection of one or more candidate actions;
inputting the set of attributes into a second response model hosted at a second user-defined representational state transfer (REST) endpoint to obtain a second selection of one or more candidate actions; and
inputting the first selection of one or more candidate actions and the second selection of one or more candidate actions into the trained machine learning model to obtain a ranked list of candidate actions; wherein the feedback corresponding to the plurality of candidate actions comprises an indication of a selected action from the ranked list of candidate actions.

6. The one or more non-transitory machine-readable media as recited in claim 2, wherein the instructions further comprise:
receiving, based on a candidate action selection described in the feedback, a determination of one or more user-defined REST endpoints of the plurality of user-defined REST endpoints; and
executing a command to pull subsets of the plurality of candidate actions from the one or more user-defined REST endpoints.

7. The one or more non-transitory machine-readable media as recited in claim 2, wherein:
the command to pull the first set of candidate actions from the first user-defined representational state transfer (REST) endpoint is executed before the command to pull the second set of candidate actions from the second user-defined representational state transfer (REST) endpoint based on a historical performance; and
the command to pull the second set of candidate actions from the second user-defined representational state transfer (REST) endpoint is executed in response to the first set of candidate actions being insufficient.

8. A method, comprising:
accessing a target customer incident associated with a set of attributes;
identifying one or more endpoints for obtaining a plurality of candidate actions for addressing the target customer incident;
executing commands to obtain, from the one or more endpoints, one or more respective subsets of a plurality of candidate actions for addressing the target customer incident;
identifying characteristics of the plurality of candidate actions;
inputting the characteristics of the plurality of candidate actions into a trained machine learning model, wherein the trained machine learning model outputs a ranked list of the plurality of candidate actions based on the characteristics;
selecting a display format for displaying the ranked list of the plurality of candidate actions;
displaying the ranked list of the plurality of candidate actions in accordance with the selected display format;
providing feedback corresponding to the ranked list of candidate actions as training data to the trained machine learning model; and
updating the trained machine learning model, using the training data, to retrain the trained machine learning model to output ranked lists of pluralities of candidate actions,
wherein the method is performed by at least one device including a hardware processor.

9. The method of claim 8, wherein displaying the ranked list of the plurality of candidate actions in accordance with the selected display format comprises modifying at least one of the plurality of candidate actions for display in accordance with the selected display format.

10. The method of claim 8, further comprising:
prior to displaying the ranked list of the plurality of candidate actions, removing a first candidate action from the plurality of candidate actions based on the first candidate action being duplicative of a second candidate action retained in the plurality of candidate actions.

11. The method of claim 8, wherein displaying the ranked list of the plurality of candidate actions comprises:
sorting subsets of the plurality of candidate actions based on a similarity criterion into one or more groups; and
displaying a single interface element for each group of the plurality of candidate actions.

12. The method of claim 8, further comprising:
receiving user input selecting and interacting with a selected candidate action of the ranked list of the plurality of candidate actions; and
responsive to receiving the user input, modifying the ranked list of the plurality of candidate actions based on the selected candidate action, the modifying being selected from a group of actions comprising: adding a new candidate action, removing the selected candidate action, and altering the selected candidate action based on interaction with the selected candidate action.

13. One or more non-transitory machine-readable media storing instructions which, when executed by one or more processors, cause performance of operations comprising:
receiving a target customer incident;
identifying a plurality of endpoints for obtaining a plurality of candidate actions for addressing the target customer incident;
executing commands to obtain, from the plurality of endpoints, a plurality of respective subsets of the plurality of candidate actions for addressing the target customer incident;
identifying characteristics of the plurality of candidate actions obtained from the plurality of endpoints;
inputting the characteristics of the plurality of candidate actions into a trained machine learning model, wherein the trained machine learning model outputs a ranked list of the plurality of candidate actions based on the characteristics;
selecting a display format for displaying the ranked list of the plurality of candidate actions;
displaying the ranked list of the plurality of candidate actions in accordance with the selected display format;
providing feedback corresponding to the ranked list of candidate actions as training data to the trained machine learning model; and
updating the trained machine learning model, using the training data, to retrain the trained machine learning model to output ranked lists of pluralities of candidate actions.

14. The one or more non-transitory machine-readable media as recited in claim 13, wherein displaying the ranked list of the plurality of candidate actions in accordance with the selected display format comprises modifying at least one of the plurality of candidate actions for display in accordance with the selected display format.

15. The one or more non-transitory machine-readable media as recited in claim 13, wherein the instructions further cause, prior to displaying the ranked list of the plurality of candidate actions, removing a first candidate action from the plurality of candidate actions based on the first candidate action being duplicative of a second candidate action retained in the plurality of candidate actions.

16. The one or more non-transitory machine-readable media as recited in claim 13, wherein displaying the ranked list of the plurality of candidate actions comprises:
sorting subsets of the plurality of candidate actions based on a similarity criterion into one or more groups; and
displaying a single interface element for each group of the plurality of candidate actions.

17. The one or more non-transitory machine-readable media as recited in claim 13, wherein the instructions further cause:
receiving user input selecting and interacting with a selected candidate action of the ranked list of the plurality of candidate actions; and
responsive to receiving the user input:
modifying the ranked list of the plurality of candidate actions based on the selected candidate action, the modifying being selected from a group of actions comprising: adding a new candidate action, removing the selected candidate action, and altering the selected candidate action based on interaction with the selected candidate action.

18. The one or more non-transitory machine-readable media as recited in claim 13, wherein the instructions further comprise:
generating the trained machine learning model by inputting a training data set into a machine learning algorithm to train a machine learning model to output ranked sets of candidate actions, the training data set comprising:
a particular input set of candidate actions;
a particular ranked set of candidate actions corresponding to a ranked order of the particular input set of candidate actions.

19. The one or more non-transitory machine-readable media as recited in claim 18, wherein:
the training data set further comprises a particular customer incident associated with the particular ranked set of candidate actions.

20. A method comprising:
receiving a target customer incident and an associated set of attributes;
based on receiving the target customer incident and the associated set of attributes: obtaining a plurality of candidate actions to address the target customer incident;
wherein obtaining the plurality of candidate actions to address the target customer incident comprises:
identifying, using a trained machine learning model, one or more endpoints of a plurality of endpoints;
obtaining the plurality of candidate actions from the one or more endpoints of the plurality of endpoints;
obtaining feedback corresponding to the plurality of candidate actions, wherein the feedback includes an indication of a selected candidate action from the plurality of candidate actions; and
updating the trained machine learning model using the feedback corresponding to the plurality of candidate actions as training data by retraining the trained machine learning model to select endpoints for obtaining candidate actions using the indication of the selected candidate action as training data;
wherein the method is performed by at least one device including a hardware processor.

* * * * *